United States Patent Office 3,421,585
Patented Jan. 14, 1969

3,421,585
LIQUID PREFLUSH COMPOSITION AND USE THEREOF IN ACIDIZING EARTH FORMATIONS
Calixto F. Garcia, Hurst, Tex., assignor to Byron Jackson Inc., Long Beach, Calif., a corporation of Delaware
No Drawing. Filed Sept. 5, 1967, Ser. No. 665,259
U.S. Cl. 166—42                                            11 Claims
Int. Cl. E21b *43/26;* E21b *33/13;* C09k *3/00*

ABSTRACT OF THE DISCLOSURE

A method of treating earth formations containing petroleum and water to stimulate production of petroleum without increasing substantially the production of water. A liquid preflush composition, including a liquid hydrocarbon, a fatty acid soap, and an agent for solubilizing the soap in the oil, which preflush composition is injected into the formation to plug the water-bearing passages while leaving the oil-bearing passages open. Thereafter an acidizing solution is pumped into the formation to selectively acidize and stimulate the oil-bearing passages. Preflush compositions for use in the method are disclosed.

BACKGROUND OF THE INVENTION

Field of the invention

This invention relates to the treatment of earth formations and to compositions used in such treatment. More particularly, this invention relates to the acidizing of calcareous earth formations, including treatment of an earth formation, preliminary to its treatment with acid, to selectively block water-bearing portions of the formation for substantially preventing flow of the acid into the water-bearing portions.

Description of the prior art

U.S. Patent No. 2,294,078, issued Aug. 25, 1942, Willard H. Dow et al., "Method of Treating Wells," discloses a method of treating oil or gas wells wherein a water solution of a fatty acid soap, such as the ammonium soap of palmitic acid, is introduced into the well and forced into an adjacent brine-bearing and oil-bearing formation. The aqueous soap solution reacts with calcium and magnesium salts dissolved in the brine contained in the brine-bearing passages to form a precipitate that blocks them. However, the oil in the oil-bearing passages does not produce a precipitate with the aqueous soap solution; hence, these passages are not blocked. The excess of the aqueous soap solution is then removed from the oil-bearing passages. Alternatively, a neutral liquid, such as oil or water, is forced into the oil-bearing passages to displace the excess of the aqueous soap solution farther back into the formation and to provide a spacer between the soap solution and the well bore. Thereafter, a charge of acid, for example aqueous hydrochloric acid, is forced into the formation. The acid is excluded from the brine-bearing passages by the precipitate that has been formed therein. But the acid flows into the oil-bearing passages and reacts with the formation to dissolve a portion of it and open up the formation to the freer flow of oil.

Where the brine-bearing passages contain brine having dissolved therein salts of sodium and the like, but no calcium or magnesium salts, phenyl sulphonic acid or similar sulphonates are employed as the fluid precipitating agent instead of a soap solution. Such sulphonates form a precipitate on contacting a sodium salt brine, whereas soap solutions do not.

Problems are involved in the practice of the method of the Dow et al patent, which problems are solved or mitigated, as will appear hereinafter, by the present invention. One problem arises because of the oleophobic character of the fluid precipitating agents used in the process disclosed in the patent. When an aqueous soap solution is forced into the formation, it moves only a short distance into the brine-bearing passages before the precipitate forms to block further entry of the solution. The solution then is diverted to flow into the oil-bearing passages. However, because of its oleophobic nature, the solution encounters great resistance to its flow in the oil-bearing passages, and it is only by the expenditure of much power that any substantial penetration of the soap solution into the oil-bearing passages can be achieved. As brine-bearing passages may run parallel to and contiguous with the oil-bearing passages, the former cannot be blocked off along the contiguous zone unless the aqueous soap solution can travel through the adjacent oil-bearing passages to reach the zone.

Another problem involved in the process of the Dow et al. patent is that the aqueous solutions of soap will not form the desired precipitate with brine, unless the brine contains calcium or magnesium salts dissolved therein.

Summary of the invention

An object of the invention is to provide an acidizing process and a preflush solution for use therein that are improvements over the process and preflush solution of the foregoing Dow et al. patent.

A further object is to provide an acidizing process and a preflush solution that, in most instances, increase the rate of production of petroleum from a well without substantially increasing the rate of water production.

These and other objects and aims of the invention, as appear in or may be inferred from this description, are realized in a method of acidizing a calcareous earth formation containing petroleum and water, the formation being in communication with a well, which method includes introducing into the well a liquid preflush composition including a liquid hydrocarbon oil, a fatty acid soap, and an agent for solubilizing the soap in the hydrocarbon oil; forcing the preflush composition into the formation; introducing into the well an oil-free, preferably an aqueous, solution of an acid capable of dissolving the formation; and forcing the solution of acid into the formation following the preflush composition.

The preflush composition is oleophilic; hence it is easy to force through the petroleum-bearing channels of the formation to contact contiguous water-bearing zones far from the well bore and block them against entry of subsequently injected acid. Thus, an extensive volume of the petroleum-bearing zones of the formation is acidized without substantially acidizing the water-bearing zones.

The preflush compositions of the invention have been found to react upon contact with most types of connate water found in petroleum reservoirs or formations to produce a precipitate that blocks the water-bearing zones. It is not essential that the connate water or brine contain dissolved calcium or magnesium salts, as a blocking precipitate is formed upon contact of the preflush composition with water alone, or with sodium brine.

Description of preferred embodiments

The art of acidizing wells has long been practiced, and its general principles are well known to persons skilled in the art. In brief, however, a solution of an acid, such as hydrochloric acid, is introduced into the well and thence into the formation to be acidized. The acid is held in the formation for a time sufficient to allow it to react with the formation matrix to dissolve portions of it, thereby increasing the size of the channels extending through the formation to allow the formation fluids to flow more readily into the well. Calcareous formations, such as limestone or dolomitric limestone formations, are particularly amenable to successful stimulation by acidizing techniques. When the acid has become depleted, the spent acid is withdrawn from the formation through the well, and the formation fluids are produced.

The liquid preflush composition of this invention includes a hydrocarbon oil as a carrier or solvent for soap. Hydrocarbon oils such as kerosene, diesel fuel, crude oil or refined fractions thereof, and the like are employed.

The fatty acid soaps are preferably produced in the hydrocarbon oil by saponification of fatty acids that are put into solution in the oil, the oil serving as a reaction medium.

A preferred fatty acid component is a refined mixture of tall oil acids commercially available from Arizona Chemical Company under the trademark "Acintol FA–1." "Acintol FA–1" has the following typical composition.

| Fatty acid: | percent by weight |
| --- | --- |
| Palmitic acid | 0.5 |
| Palmitoleic acid | 0.5 |
| Stearic acid | 2.5 |
| Oleic acid | 52.5 |
| Linoleic acid | 37.0 |
| Linoleic acid, conjugated | 6.0 |
| Linolenic acid, other acids and unknowns | 1.0 |

Both saturated and unsaturated fatty acids, and mixtures thereof can be used. Suitable saturated fatty acids include palmitic, stearic, arachidic, behenic, and lignoceric acids. Suitable unsaturated acids include lauroleic, myristoleic, palmitoleic, oleic, gadoleic, erucic, ricinoleic, linoleic, linolenic, eleostearic, licanic, arachidonic, and clupanodonic acids. In general, fatty acids having from 12 to 23 carbon atoms are employed.

The preferred base used to saponify the fatty acids is aqueous ammonium hydroxide, conveniently the 26° Bé. solution. Other bases that can be used include gaseous ammonia, sodium hydroxide, potassium hydroxide, urea and lower amines, for example triethanol amine.

The liquid preflush composition of the invention contains an agent for solubilizing the soap in the hydrocarbon oil. Such agents are surface active agents that are soluble in the oil and have a peptizing effect on the soap to prevent its precipitation until the preflush composition contacts water or aqueous solutions, such as connate brines. The presently preferred solubilizing agent is a mixture of alkylphenoxy polyethleneoxy ethanols. The agent may be prepared by the direct oxyethylation of alkyl phenols. Each molecule of the resulting adduct has a whole number of oxyethylene groups, but the mixture that is produced contains molecules having different numbers of oxyethylene groups; hence, the extent of oxyethylation of the mixture may be expressed as an average, not necessarily a whole number. The preferred class of agents are alkylphenoxy (ethyleneoxy)$_{n_{avg}}$ ethanols wherein $n$ is a number from about 2.5 to about 3.5. The alkyl group may contain from about 6 to about 12 carbon atoms. Specific solubilizing agents in accordance with the invention may be nonylphenoxy (ethyleneoxy)$_{3_{avg}}$ ethanol and octylphenoxy (ethyleneoxy)$_{3_{avg}}$ ethanol. The former is the 4 mole ethylene oxide adduct of nonylphenol having the following formula:

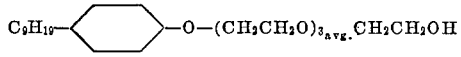

It is sold commercially under the trademark "Igepal C0430."

The ethanols employed are represented by the general formula:

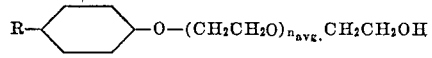

wherein R is an alkyl radical containing from about 6 carbon atoms to about 12 carbon atoms, and $n$ is a number from about 2.5 to about 3.5.

Aqueous solutions of acids capable of dissolving the formation are injected into the formation following the preflush composition. Aqueous hydrochloric acid solutions, typically those of 15% or 28% concentration, are suitable and preferred, but the concentration of the hydrochloric acid may be intermediate, or lower or higher than, these values. Other acids that are conventionally used in acidizing may also be employed in practicing this invention. The acid solutions may, if desired, include surfactants, corrosion inhibitors, retarders, and other conventional additives.

The following examples (Examples No. 1 and No. 2) illustrate the preparation of typical preflush compositions.

Example No. 1

A preflush concentrate is prepared in a 250 gallon tank equipped with an agitator for stirring liquid contained in the tank. Forty nine and one-half (49.5) gallons of kerosene are placed in the tank and agitated. To the kerosene are added 29.5 gallons of "Acintol FA-1" having the analysis given hereinbefore, and the mixture is stirred for about five (5) minutes to insure dissolution of the "Acintol FA-1" in the kerosene. Then, 14.5 gallons of "Igepal C0430" are added to the solution, and the contents of the tank are stirred for about five (5) minutes more. While the contents of the tank are being vigorously stirred, 6.5 gallons of 26° Bé. aqueous ammonium hydroxide are added, and the contents of the tank are stirred for about five (5) minutes longer. Thus is produced approximately 100 gallons of preflush concentrate.

Five hundred gallons of preflush composition are made by mixing 100 gallons of the foregoing concentrate with 400 gallons of kerosene. The resulting composition is a thin, easily pumpable liquid.

In making the concentrate, it is desirable that the "Igepal CO430" be added to the reaction tank prior to saponification of the "Acintol FA-1" with the ammonium hydroxide, for if saponification is done in the absence of the solubilizing agent, the soap will be precipitated in the reaction tank. However, should this happen, the precipitated soap can be redissolved in the kerosene by the addition of the "Igepal CO430" with vigorous stirring.

It has been found advantageous to use somewhat less than the quantity of ammonium hydroxide or other base stoichiometrically required to completely saponify the fatty acids. From about 90% to about 98% of the stoichiometric quantity of base is believed to be the optimum range. If more base is used, the thin liquid preflush concentrate may set into a solid gel.

Example No. 2

Approximately five-hundred (500) gallons of preflush composition are prepared by first dissolving 29.5 gallons of oleic acid in 445.5 gallons of diesel fuel. Next, 14.5 gallons of octylphenoxy (ethyleneoxy)$_{3_{avg}}$ ethanol are dissolved in the solution. Thereafter, the oleic acid is saponified by mixing into the solution 6.5 gallons of aqueous ammonium hydroxide (26° Bé.), which is 96% of the quantity required for complete saponification. A thin liquid results which is easily pumped into a well and into a contiguous earth formation.

In Example Nos. 1 and 2, for each 100 parts by volume of liquid preflush composition, there are approximately 90 parts by volume of hydrocarbon oil, approximately 7 parts by volume of soap, and approximately 3 parts by volume of solubilizing agent. However, these proportions are illustrative of the invention and not critical to it. The proportions of ingredients may be varied. A practical working range has been found to be from about 3.5 to about 18 parts by volume of soap and about 1.5 to about 6 parts by volume of solubilizing agent to 90 parts by volume of hydrocarbon oil.

Laboratory tests

A cylindrical core, 2" in length and 1" in diameter, is drilled from limestone from the Bedford formation. The core is cut in half along its major axis. One half is saturated with kerosene to simulate an oil-bearing portion of a formation. The other half is saturated with a synthetic brine (8.5% NaCl; 2.5% $CaCl_2$; 90% water) to simulate a water-bearing portion of the formation. The two halves are put back together with a thin rubber membrane separating them. The thus treated and reassembled core is loaded into a core-testing cell in which liquid can be caused to flow axially through the core.

Preflush composition in accordance with the foregoing Example No. 1 is pumped through the core to saturate it to the extent possible. Thereafter, 28% aqueous hydrochloric acid solution is pumped through the core at a slow rate to permit the acid to react with the limestone. Thereafter, the core is flushed with water.

The core is then removed from the testing cell and the two halves are visually examined. The core half that was originally saturated with kerosene shows severe attack by the acid, whereas the half that was originally saturated with brine shows only superficial etching of its upstream end without any dissolution of its main body.

From this test, it is evident that the preflush treatment precludes the flow of acid through the brine-saturated half of the core. The entire flow of acid is diverted through the oil-saturated half of the core, wherein the acid reacts with the matrix.

Field practices

The following is an outline of a general procedure that may be followed in treating an oil well in accordance with the invention.

(I) Clean all of the mixing tanks, pumps and lines so that they are free of water, acid, and chemicals. If these substances are present in the equipment, they may cause the premature and undesired formation of a soap precipitate when they are contacted by the preflush composition.

(II) The formation to be treated is isolated to insure that the treating liquids enter such formation only. The formation is isolated in a well known manner by using, for example, a bridge plug below the formation and a packer on the tubing above the formation.

(III) If the well is loaded with water, it is better not to pump such water into the formation, but to circulate it out of the isolated zone with clean, water-free crude oil. This step minimizes contamination of the oil-bearing portions of the formation with water.

(IV) A spearhead of a few barrels of clean, water-free crude oil, kerosene, or diesel fuel is pumped down the tubing and into the formation. The spearhead preferentially enters the oil-bearing portions of the formation and sweeps ahead of it any water therein. This assures that the preflush composition, which follows, will contact the spearhead, rather than water, in the oil-bearing passages.

(V) Liquid preflush composition is next pumped into the formation. It flows into and through the oil-bearing passages without forming a soap precipitate. When it encounters a water-bearing passage and contacts the water at the entrance thereof, the soap is precipitated and fills the pores of the water-bearing passage, thereby stopping further flow of preflush composition thereinto.

(VI) A pad or spacer of a few barrels of clean, water-free crude oil, kerosene or diesel fuel is then injected into the well and into the formation. The spacer fluid preferentially enters the oil-bearing passages and forces the preflush liquid and spearhead further back into the formation. Although there may be a slight tendency of the spacer fluid to dissolve the soap precipitate in the entrances of the water-bearing passages, the volume of the spacer, the pressure tending to drive it into such passages, and the time during which the spacer can contact the precipitate are kept to minimums. Thus, in practice, the precipitate is not dissolved in the spacer to any significant degree, and the water-bearing passages remain blocked.

(VII) Acid solution is then pumped down the tubing and into the formation. Because the water-bearing passages are blocked, the acid solution cannot flow into them. Instead it flows into the oil-bearing passages, pushing back the spacer liquid, the preflush, and the spearhead, which perform their functions as they successively encounter adjoining oil-bearing and water-bearing passages farther back in the formation. The acid solution used is preferably an aqueous solution; it should not contain any substantial proportion of oil, as do the acid-in-oil emulsions sometimes employed in acidizing wells, because such oil would dissolve some or all of the soap precipitate in adjoining water-bearing passages and allow the acid to enter them and react with the formation matrix therein, thus defeating the main purpose of the invention. Small proportions of oil can be tolerated in the acid. The acid is injected at relatively low rates in order to minimize the possibility of fracturing the formation or dislodging the soap precipitate from the water-bearing zones.

(VIII) When the required volume of acid has been pumped into the formation, the well is shut in for a period of a few hours to allow the acid to react with the formation, principally in the oil-bearing zones thereof.

(IX) When the acid treatment is completed, the well is produced in the usual manner. The spent acid is produced first. Thereafter the spacer, the preflush solution, and the spearhead are produced, usually in that order. Formation fluids are then produced. In withdrawing the treating solutions from the oil-bearing passages, the spacer flushes the spent acid from the passages so that the preflush solution, which follows the spacer, will not contact the spent acid and form an unwanted precipitate in the oil-bearing passages.

The soap precipitate is soluble in oil. Hence, as production continues, the precipitate in the water-bearing passage is, in time, dissolved by the produced oil, and water is again produced. However, the rate of production of water is generally not substantially increased by the foregoing well treatment, yet the rate of production of oil is usually significantly increased.

If, despite the precautions taken to prevent precipitation of soap in the oil-bearing passages, some soap does precipitate, no great harm is done, as the precipitate is soluble in the formation oil and will be dissolved in the oil and carried from the formation by it.

The volumes of the treating solutions that are used will, of course, depend on the type of formation, its thickness, and the distance outward from the well that the formation is to be treated. Field experience is the best guide in these matters. In treating formations having thicknesses of from about 1 ft. to about 20 ft., about 5 barrels of spearhead, about 250 gallons to 500 gallons of preflush composition, from about 2 to 5 barrels of spacer, and from about 2,000 gallons to 10,000 gallons of acid are advantageously used.

The following example sets forth an illustrative well treatment.

Example No. 3

An oil well in Callahan County, Texas, was producing a mixture of oil and water from the Palo Pinto Reef formation. The rate of production before treatment was 14 barrels of oil per day and 28 barrels of water per day.

In accordance with the general procedure hereinbefore described, the isolated pay zone was cleared of water by circulating it out of the pay zone with clean, water-free lease crude oil. About 5 barrels of the crude oil was pumped into the formation as a spearhead. Five-hundred gallons of liquid preflush composition made in accordance with Example No. 1 was next pumped into the formation. A spacer of 3 barrels of clean, water-free lease crude oil was thereafter pumped into the formation. Then, 2,000 gallons of 28% aqueous hydrochloric acid was pumped into the formation and held therein for about 3 hours. The well was then put on production. After the well had been purged of the treating liquids, and new rates of production had become established, the well made 29 barrels of oil per day and 28 barrels of water per day. Thus it is seen that the rate of oil production was slightly more than doubled by the treatment, without increasing the rate of water production.

In the table below, other case histories of oil wells treated in accordance with the invention are summarized.

TABLE NO. 1

| County, state, and formation | Gallons of preflush composition per Example No. 1 | Gallons of aqueous HCl | Production (barrels per day) | | | |
|---|---|---|---|---|---|---|
| | | | Before treatment | | After treatmenty | |
| | | | Oil | Water | Oil | Water |
| Runnels, Texas, Caddo lime | 500 | 1 2,000 | ¼ | 40 | 6 | 50 |
| Stephens, Texas, Mississippi lime | 500 | 2 7,500 | 3 | 0 | 8 | 0 |
| Callahan, Texas, Palo Pinto reef | 500 | 1 2,000 | 2 | 3 | 7 | 5 |

1 28% concentration.
2 15% concentration.

Table No. 1 shows the oil production was stimulated by the treatment, but that water production was either not stimulated at all or only stimulated to a minor degree.

From the foregoing description it is seen that the present invention provides a process for stimulating oil wells and a preflush solution for use in the process that achieve the objects of the invention. The specific examples given herein are merely illustrative and are not to be considered as limiting the invention, which is to be construed in accordance with the following claims.

I claim:
1. A method of acidizing a calcareous earth formation containing petroleum and water, the formation being in communication with a well, which comprises:
    (a) introducing into the well a liquid preflush composition comprising a liquid hydrocarbon oil, a fatty acid soap, and an agent for solubilizing the soap in the hydrocarbon oil;
    (b) forcing said preflush composition into the formation;
    (c) introducing into the well a substantially oil-free solution of an acid capable of dissolving the formation; and
    (d) forcing said solution of acid into the formation following said preflush composition.

2. The method defined in claim 1 wherein said agent comprises a mixture of compounds having the following formula:

wherein R is an alkyl group containing from about 6 carbon atoms to about 12 carbon atoms, and $n$ is a number from about 2.5 to about 3.5.

3. The method defined in claim 1 wherein said agent comprises nonylphenoxy (ethyleneoxy)$_{3\text{avg.}}$ ethanol.

4. The method defined in claim 1 wherein said agent comprises octylphenoxy (ethyleneoxy)$_{3\text{avg.}}$ ethanol.

5. The method defined in claim 1 wherein said agent comprises alkylphenoxy (ethyleneoxy)$_{n\text{avg.}}$ ethanol wherein $n$ is a number from about 2.5 to about 3.5.

6. The method defined in claim 1 wherein said agent comprises a surface active, oil-soluble, ethylene oxide adduct.

7. A method of acidizing a calcareous earth formation containing petroleum and water, the formation being in communication with a well, which comprises:
    (a) introducing into the well a liquid preflush composition comprising a liquid hydrocarbon oil, a soap formed from a fatty acid containing from 12 to 22 carbon atoms saponified with a base selected from the group consisting of $NH_4OH$, $NH_3$, NaOH, KOH, urea and lower amines, and alkylphenoxy (ethyleneoxy)$_{n\text{avg.}}$ ethanol wherein $n$ is a number from about 2.5 to about 3.5;
    (b) forcing said preflush composition into the formation;
    (c) introducing into the well a substantially oil-free solution of an acid capable of dissolving the formation; and
    (d) forcing said solution of acid into the formation following said preflush composition.

8. A method of acidizing a calcareous earth formation containing petroleum and water, the formation being in communication with a well, which comprises:
    (a) introducing into the well a liquid preflush composition comprising a liquid hydrocarbon oil, the ammonium soap of tall oil acids, and octylphenoxy (ethyleneoxy)$_{3\text{avg.}}$ ethanol;
    (b) forcing said preflush composition into the formation;
    (c) introducing into the well a substantially oil-free solution of hydrochloric acid capable of dissolving the formation; and
    (d) forcing said solution of acid into the formation following said preflush composition.

9. A method defined in claim 8 wherein said hydrocarbon oil, said soap, and said octylphenoxy (ethyleneoxy)$_{3\text{avg.}}$ ethanol are present in the proportions of about 7 parts by volume of said soap and about 3 parts by volume of said octylphenoxy (ethyleneoxy)$_{3\text{avg.}}$ ethanol to 90 parts by volume of said oil.

10. A method as defined in claim 8 wherein said hydrocarbon oil, said soap, and said octylphenoxy (ethyleneoxy)$_{3\text{avg.}}$ ethanol are present in the proportions of about 3.5 to about 18 parts by volume of said soap and about 1.5 to about 6 parts by volume of said octylphenoxy (ethyleneoxy)$_{3\text{avg.}}$ ethanol to 90 parts by volume of said oil.

11. A composition for injection into an earth formation containing petroleum and water to selectively block water-bearing portions of the formation which comprises:
    (a) a liquid hydrocarbon oil;
    (b) a fatty acid soap; and
    (c) alkylphenoxy (ethyleneoxy)$_{n\text{avg.}}$ ethanol wherein $n$ is a number from about 2.5 to about 3.5.

References Cited
UNITED STATES PATENTS

| | | | |
|---|---|---|---|
| 2,079,431 | 5/1937 | Cannon | 166—32 |
| 2,122,452 | 7/1938 | Clason | 166—32 |
| 2,143,991 | 1/1939 | Loomis | 166—32 |
| 2,294,078 | 8/1942 | Dow et al. | 166—32 |
| 2,890,752 | 6/1959 | Crone et al. | 166—22 |
| 3,082,822 | 3/1963 | Holm et al. | 166—9 |
| 3,212,575 | 10/1965 | Fisher et al. | 166—9 |
| 3,246,694 | 4/1966 | Taber et al. | 166—9 |
| 3,289,759 | 12/1966 | Fisher | 166—9 |
| 3,343,602 | 9/1967 | Knox et al. | 166—42 |
| 3,346,047 | 10/1967 | Townsend et al. | 166—9 |

STEPHEN J. NOVOSAD, *Primary Examiner.*

U.S. Cl. X.R.
166—32; 252—8.55